United States Patent
Duan et al.

(10) Patent No.: US 11,677,524 B2
(45) Date of Patent: Jun. 13, 2023

(54) QCL DETERMINATION FOR A-CSI-RS IN FULL DUPLEX SYSTEMS

(71) Applicant: QUALCOMM INCORPORATED, San Diego, CA (US)

(72) Inventors: Weimin Duan, San Diego, CA (US); Huilin Xu, San Diego, CA (US); Alexandros Manolakos, Escondido, CA (US); June Namgoong, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 16/949,694

(22) Filed: Nov. 11, 2020

(65) Prior Publication Data

US 2021/0143954 A1     May 13, 2021

Related U.S. Application Data

(60) Provisional application No. 62/934,350, filed on Nov. 12, 2019.

(51) Int. Cl.
*H04L 5/00* (2006.01)

(52) U.S. Cl.
CPC .......... *H04L 5/0048* (2013.01); *H04L 5/0023* (2013.01)

(58) Field of Classification Search
CPC ... H04L 5/0048; H04L 5/0023; H04L 5/0053; H04L 5/0091; H04L 27/261; H04L 5/001;

(Continued)

(56) References Cited

U.S. PATENT DOCUMENTS

2018/0083679 A1* 3/2018 Lim ................. H04B 17/336
2019/0297603 A1 9/2019 Guo et al.
(Continued)

OTHER PUBLICATIONS

ERICSSON: "On Beam Indication, Measurement, and Reporting", 3GPP Draft, 3GPP TSG-RAN WG1 NR Ad Hoc #3, R1-1716350 On Beam Indication, Measurement, and Reporting, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051339805, 13 Pages, Retrieved from the Internet: URL:http://www.3gpp.org/ftp/Meetings_3GPP_SYNC/RAN1/Docs/ [retrieved on Sep. 17, 2017], section 3.

(Continued)

*Primary Examiner* — Ian N Moore
*Assistant Examiner* — Sun Jong Kim
(74) *Attorney, Agent, or Firm* — Haynes and Boone, LLP/Qualcomm Incorporated

(57) ABSTRACT

Wireless communications systems and methods related to determining a QCL for receiving a reference signal are provided. A user equipment (UE) determines a QCL configuration for receiving a reference signal during a first time period based on a transmit beam direction to be used for transmission during the first time period. The user equipment receives the reference signal using a first receive beam direction based on the QCL configuration while transmitting a first communication signal using the transmit beam direction in a common frequency band during the first time period.

28 Claims, 10 Drawing Sheets

(58) Field of Classification Search
CPC ....... H04L 5/0035; H04L 5/0082; H04L 5/14; Y02D 30/70; H04W 52/0219; H04W 52/0216; H04B 7/088; H04B 7/0695
See application file for complete search history.

(56) References Cited

U.S. PATENT DOCUMENTS

| | | | |
|---|---|---|---|
| 2020/0305157 A1* | 9/2020 | Kim | H04W 74/0833 |
| 2022/0209918 A1* | 6/2022 | Matsumura | H04L 5/0053 |
| 2022/0210812 A1* | 6/2022 | Matsumura | H04B 7/088 |
| 2022/0225120 A1* | 7/2022 | Matsumura | H04L 5/0051 |

OTHER PUBLICATIONS

HUAWEI., et al., "Beam Indication for Control and Data Channels", 3GPP Draft, 3GPP TSG RAN WG1 Meeting 90bis, R1-1718238, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13- 2017, Oct. 8, 2017 (POct. 8, 2017), XP051341420, 8 Pages, Retrieved from the Internet:URL:http://www.3gpp.org/ftp/Meetings_3GPP_SYNC/RAN1/Docs/ [retrieved on Oct. 8, 2017].
International Search Report and Written Opinion—PCT/US2020/060072—ISA/EPO—dated Apr. 1, 2021.
Partial International Search Report—PCT/US2020/060072—ISA/EPO—dated Feb. 11, 2021.

* cited by examiner

QCL DETERMINATION FOR A-CSI-RS IN FULL DUPLEX SYSTEMS

CROSS REFERENCE TO RELATED APPLICATIONS

The present application claims priority to and the benefit of U.S. Provisional Patent Application No. 62/934,350, filed Nov. 12, 2019, which is hereby incorporated by reference in its entirety as if fully set forth below and for all applicable purposes.

TECHNICAL FIELD

The present disclosure is directed to wireless communication systems and methods. The present disclosure includes determining quasi-co-location (QCL) information for an aperiodic channel state information reference signal (A-CSI-RS) in full duplex systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may configure a UE with quasi-co-location (QCL) related information for receiving DL communications from the BS. Two antenna ports are quasi-co-located when a signal received from one antenna port experiences a same channel or at least a similar channel as another signal received from the other antenna port. QCL can be at various levels. For instance, QCL can be in terms of doppler shift, doppler spread, average delay, delay spread, and/or receive spatial parameter.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprises determining, by a user equipment (UE), a quasi-co-location (QCL) configuration for receiving a reference signal during a first time period based on a transmit beam direction to be used for transmission during the first time period; and receiving, by the UE from a base station (BS), the reference signal using a first receive beam direction based on the QCL configuration while transmitting a first communication signal using the transmit beam direction in a common frequency band during the first time period.

In an additional aspect of the disclosure, a UE comprises a processor configured to determine a QCL configuration for receiving a reference signal during a first time period based on a transmit beam direction to be used for transmission during the first time period; and a transceiver configured to receive from a BS the reference signal using a first receive beam direction based on the QCL configuration while transmitting a first communication signal using the transmit beam direction in a common frequency band during the first time period.

In an additional aspect of the disclosure, a non-transitory computer-readable medium has program code recorded thereon. The program code comprises code for causing a UE to determine a QCL configuration for receiving a reference signal during a first time period based on a transmit beam direction to be used for transmission during the first time period; and code for causing the UE to receive from a BS the reference signal using a first receive beam direction based on the QCL configuration while transmitting a first communication signal using the transmit beam direction in a common frequency band during the first time period.

In an additional aspect of the disclosure, a UE comprises means for determining a QCL configuration for receiving a reference signal during a first time period based on a transmit beam direction to be used for transmission during the first time period; and means for receiving from a BS the reference signal using a first receive beam direction based on the QCL configuration while transmitting a first communication signal using the transmit beam direction in a common frequency band during the first time period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
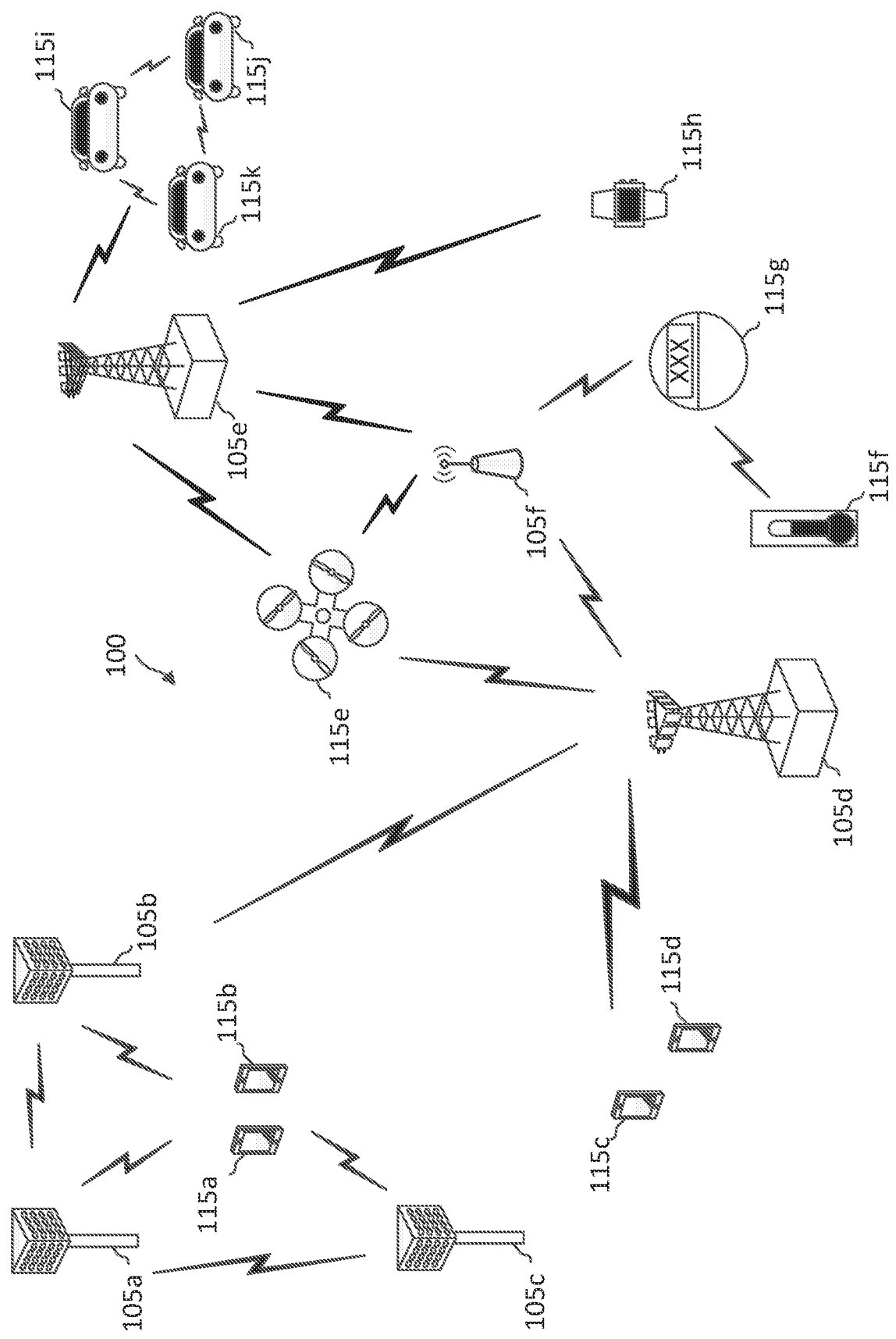
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

It being considered that in a future release NR technology may include a full-duplex mode, where a device can receive downlink and transmit uplink simultaneously in the same frequency bandwidth. In a half-duplex mode, downlink and uplink are on different frequency bands or are sent at different times within the same frequency band. Full duplex mode can result in self-interference (SI), which is when the downlink and uplink signals that are simultaneously received and transmitted by the UE within the same frequency band can interfere with each other. Similarly, a BS can experience SI when transmitting downlink signals and receiving uplink signals simultaneously in the same frequency band.

When receiving reference signals such as the aperiodic channel state information reference signal (A-CSI-RS), the UE can determine what quasi-co-location (QCL) type and configuration to utilize. QCL is configured by the network, and the UE can determine which QCL to utilize through downlink control information (DCI) or other means. For example, the UE can determine, based on a transmission configuration indicator (TCI) state that indicates QCL, to utilize a specific configuration of QCL Type-D. In particular, QCL Type-D relates to the spatial parameters used by a UE for beam forming to receive a signal such as the A-CSI-RS. For instance, a UE can utilize the TCI state decoded from downlink control information (DCI) to determine the QCL and configuration, including QCL Type-D (e.g. using a look-up table). However, if the DCI has not yet been received or decoded, then the UE determines a QCL Type-D and configuration to utilize. In some aspects, a QCL value or configuration may refer to a receive beam index, where a set of spatial beamforming parameters may be used to generate a receive beam corresponding to the receive beam index. When operating in a full-duplex mode, depending on the spatial parameters for the uplink transmission beam used by the UE in the symbol in which the A-CSI-RS is to be received, there can be SI with the uplink beam. An uplink transmission beam is a transmission beam used by a UE in an uplink direction. Accordingly, aspects of the present disclosure are directed to selecting a configuration for the QCL Type-D that minimizes the SI between the uplink transmission and receiving the A-CSI-RS.

One approach for selecting the QCL Type-D configuration is to utilize the QCL configuration that was used to receive a control-resource set (CORESET). For instance, this approach can be used in half-duplex mode (e.g. 3GPP TS 38.214 Rel-15 subclause 5.2.1.51). However, this approach may not account for the potential interference between the uplink and downlink beams. For example, if the CORESET QCL configuration is selected to serve as a QCL Type-D configuration for receiving the A-CSI-RS, then the UE's uplink beam may have had a certain direction or spatial pattern when the CORESET was received that is different than the uplink beam that will be used by the UE when it receives the A-CSI-RS. As a result of the change in the uplink beam, there can be an unacceptable level of SI if the UE simply applies the CORESET QCL configuration when receiving the A-CSI-RS.

The present application describes mechanisms for a full-duplex UE to determine a QCL configuration for receiving a downlink reference signal that accounts for the uplink beam direction. For instance, the UE can be configured to determine whether or not to use a potential QCL Type-D configuration based on the UE's uplink beam direction in the same time period in which the A-CSI-RS will be received. The UE's determination of whether a potential QCL Type-D configuration is usable based on the UE's uplink beam direction can include, for example, determining whether the potential QCL Type-D configuration is associated with an uplink beam that will result in strong or unacceptable SI (e.g., based on a certain interference measurement threshold) and is thus usable, or not. The present application, in addition to determining whether a first potential QCL configuration is useable, further describes a mechanism for determining second (and third, etc.) potential QCL configuration in the event that the first potential QCL configuration is unusable.

In some aspects, the UE determines the QCL Type-D for A-CSI-RS in a full duplex system. For instance, if the time offset between the PDCCH carrying the triggering DCI with TCI states and the A-CSI-RS is greater than a threshold, the UE can apply the QCL assumption indicated by the TCI state in the DCI that is decoded from PDCCH. In this regard, the network can configure the QCL assumption to account for interference such as SI and indicate the QCL assumption via the TCI state in the triggering DCI. Further, if the time offset between the PDCCH carrying the triggering DCI with TCI states and the A-CSI-RS is less than a threshold, the UE can determine if there is any other downlink signal with an indicated TCI state in the same symbol(s) as the A-CSI-RS resource and apply the QCL configuration of this other downlink signal, if present, when receiving the A-CSI-RS. If there are no other downlink signals with an indicated TCI state in the same symbol(s) as the A-CSI-RS resource, then the UE can consider the QCL configuration for the CORESET associated with the UE's monitored search space having the lowest CORESET-ID. In some aspects, when selecting the CORESET associated with the UE's monitored search space having the lowest CORESET-ID, the UE can determine whether or not the QCL configuration of that CORESET is usable. If yes, then the QCL configuration of the CORESET is selected as the QCL configuration for receiving the A-CSI-RS. If not, then the UE can evaluate further potential QCL configuration(s) for use in receiving the A-CSI-RS.

In some aspects, if the potential QCL configuration associated with the lowest CORESET-ID is determined to be unusable, then the UE can consider the next lowest CORESET-ID. The UE can repeat this approach for each CORESET-ID until a suitable QCL configuration is identified. If none of the QCL configurations associated with any of the CORESETs in the UE's monitored search space are determined to be usable, then the UE can consider the TCI state having the lowest TCI state ID among the set of activated and/or configured TCI states. The UE can select its QCL Type-D configuration as the default value based on the TCI state if the associated QCL configuration is determined to be usable. If the QCL configuration associated with the TCI state is determined to be not usable, then the UE considers the next lowest TCI state ID from among the set of activated and/or configured TCI states.

In some aspects, for A-CSI-RS reception on a cell without any monitored CORESET, the QCL Type-D configuration to be used for receiving the A-CSI-RS is selected from the most recent and usable downlink channel or downlink reference signal.

Aspects of the present disclosure can provide several benefits. For example, the present disclosure provides for backwards compatibility with the prior-release QCL determination procedure, since the UE applies the half-duplex rule when possible. Additionally, determining the QCL configuration based on the direction of the UE's uplink beam during the same time period in which the A-CSI-RS is to be received beneficially identifies usable QCL configurations to apply to the reception of the A-CSI-RS, as opposed to unusable values that would result in interference with the UE's uplink beam. Further, the present disclosure beneficially provides a procedure for selecting a QCL Type-D configuration in the event that none of the CORESET QCL Type-D configurations are usable, or in the event that the cell does not have any configured CORESETs.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications. In some aspects, the BS 105 and UE 115 may perform full-duplex mode, in which each of the BS 105 and UE 115 can receive and transmit simultaneously in the same frequency bandwidth. Alternatively, the BS 105 and UE 115 may perform half-duplex mode, in which each of the BS 105 and UE 115 transmit and receive in different frequency bands (e.g. FDD mode) or transmit and receive at different times (e.g. TDD mode).

In some aspects, the network 100 may operate to provide an aperiodic channel state information reference signal (A-CSI-RS) to the UE so that the UE can report back to the network measurements and parameters related to the channel state or channel quality received by the UE. The network may further operate to provide other downlink reference signals to the UE (e.g. DM-RS) or other downlink channels (e.g. PDCCH, PDSCH) to the UE. The network may provide other downlink signals or channels to the UE at the same time or in the same symbol in which the A-CSI-RS is provided. The network may further provide one or more CORESETs to the UE in a given cell, each having an associated index or CORESET-ID. The network may also configure the UE with a secondary cell in addition to a primary cell, where the secondary cell may not include any CORESETs. The network may provide the CORESETs in the active BWP or monitored search space.

In some aspects, the network 100 may provide a trigger or grant to the UE indicating that the UE is to receive, on one or more subsequent symbols, the A-CSI-RS signal. The network may provide this trigger in the form of downlink control information (DCI) transmitted in a PDCCH. The network may also provide, in PDCCH DCI, a quasi-co-location (QCL) configuration to be used to decode the A-CSI-RS. For instance, the QCL configuration may be indicated in a transmission configuration indicator (TCI) state. The network may communicate this TCI state via a TCI state ID field in PDCCH DCI. The network may also communicate the TCI state for the UE to receive the PDCCH itself, and/or other downlink channels or signals, also by a TCI state ID. In some instances, the network may configure the UE with TCI states in configuration data, thereby assigning an index to a configured state. The network may then activate or deactivate configured TCI states via a bitmap, where each bit position represents a TCI state index and the bit value indicates whether that index is activated/deactivated. For instance, the network may activate/deactivate TCI states for the physical downlink shared channel (PDSCH).

In some aspects, the UE 115 may determine, based on the A-CSI-RS grant provided by the base station, that the time required for the UE to decode DCI indicating the QCL Type-D for A-CSI-RS reception is greater that the time until which the UE will receive the A-CSI-RS. For instance, the UE may determine that the timing offset between the last symbol of the PDCCH carrying the triggering DCI and the first symbol of the A-CSI-RS is greater than a threshold. Further, the threshold value may depend on the UE's capabilities (e.g. a UE that can decode and process the PDCCH CSI faster, and can thus obtain the QCL Type-D faster and before the arrival of the A-CSI-RS, will have a lower threshold value).

Figure 2:
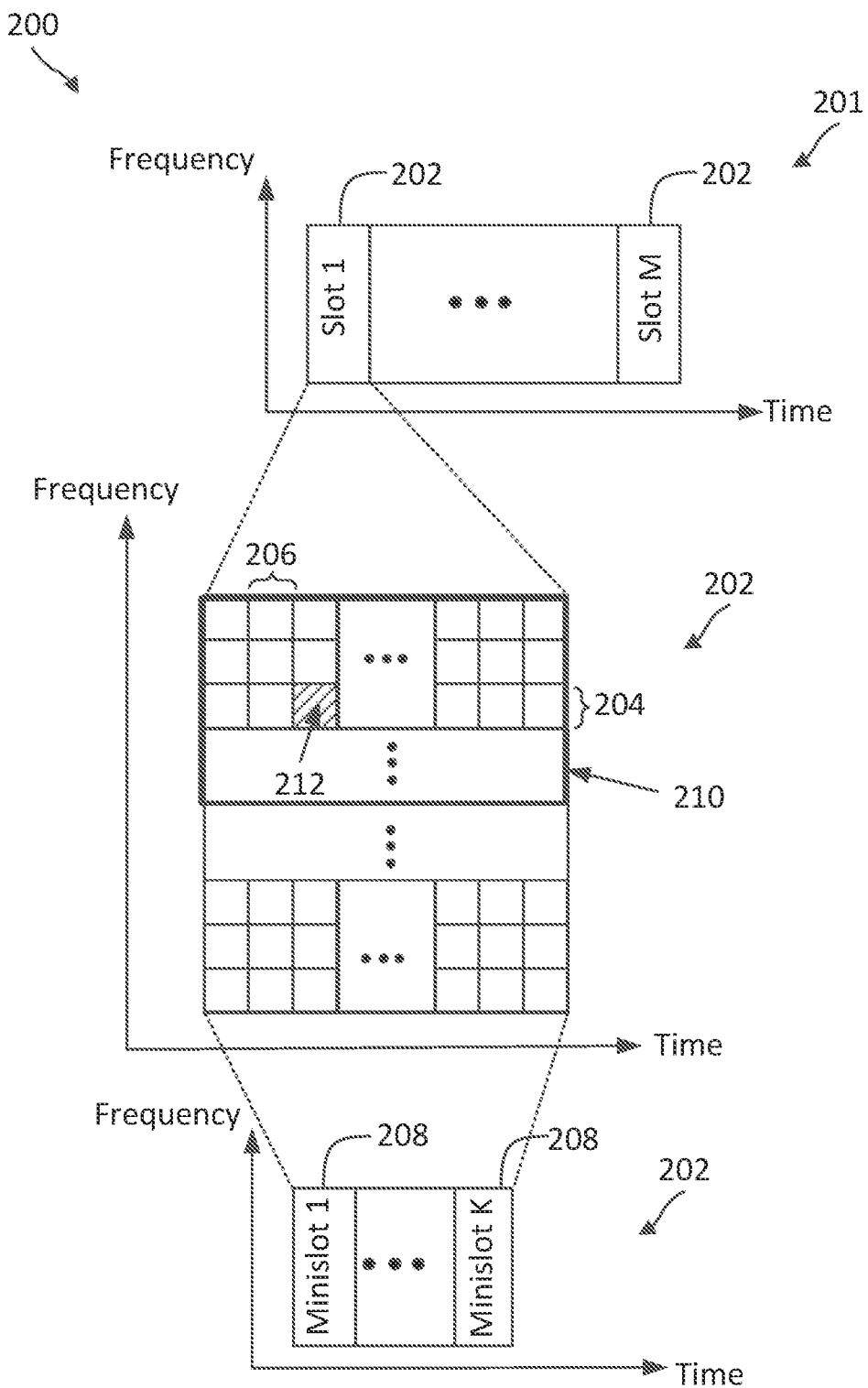
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
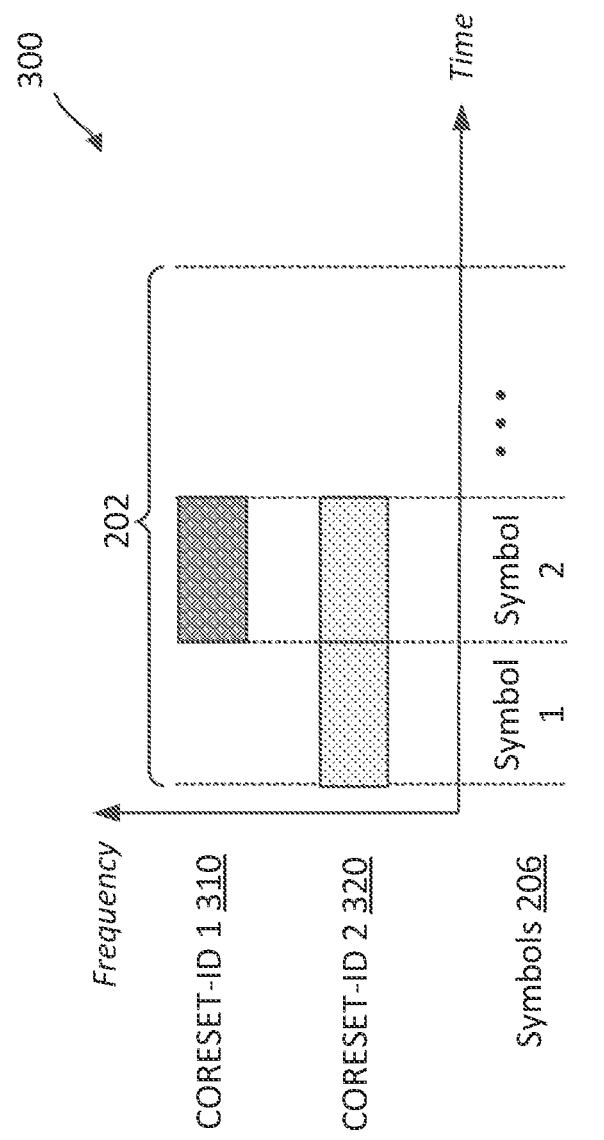
FIG. 3 illustrates an example control resource set (CORE-SET) configuration according to some aspects of the present disclosure.

FIG. 3 illustrates an example CORESET configuration 300 according to some aspects of the present disclosure. The configuration 300 may be employed by a BS such as the BSs 105 and a UE such as the UEs 115 in a network such as the network 100. In particular, the BS may configured the UE with search spaces according to the CORESET configuration for DL control information (e.g., PDCCH) monitoring. CORESET 310 is an example CORESET having CORESET-ID 1, and CORESET 320 is an example CORESET having CORESET-ID 2. As indicated by the shaded symbols 206 denoting CORESET reception, the UE receives the various CORESETs at different times. For example, at S0, where shading is only indicated for CORESET-ID 2, the UE only receives CORESET-ID 2; then, at S1, the UE receives both CORESET-ID 1 and CORESET-ID 2 at the same time, i.e. in the same symbol.

In the illustrated example of FIG. 3, the lowest CORESET-ID received by the UE is different for Slot0 compared to Slot1. For instance, in Slot2, for the latest received slot (Slot1), the lowest CORESET-ID is CORESET-ID 1. Meanwhile, in Slot1, for the latest received slot (Slot0), the lowest CORESET-ID is CORESET-ID 2.

Figure 4A:
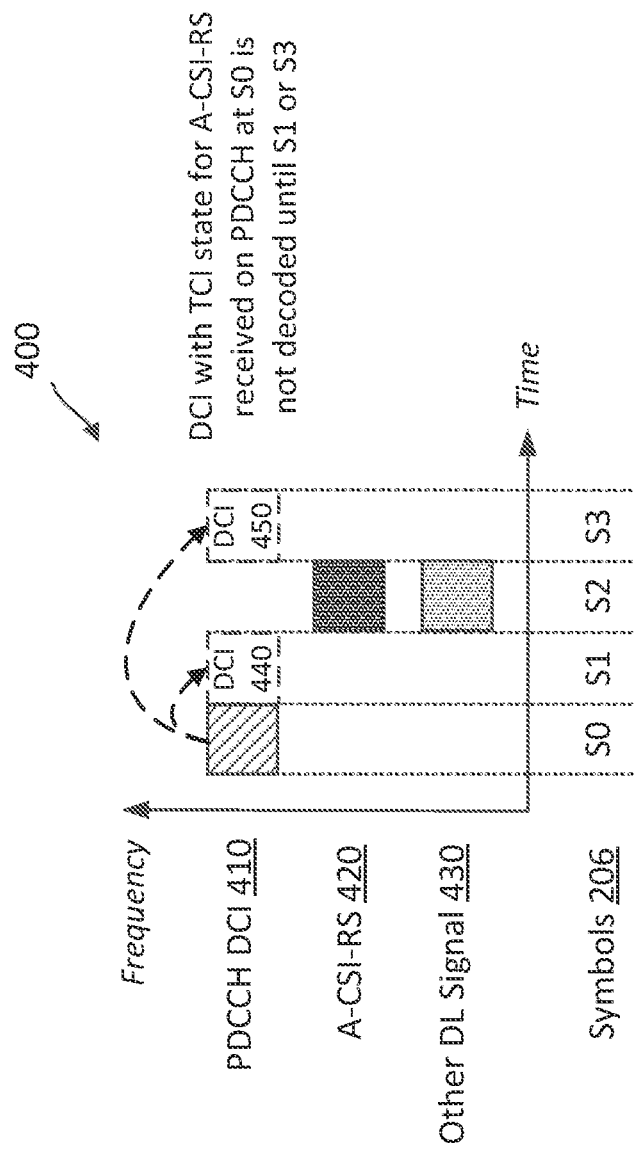
FIG. 4A is a timing diagram illustrating physical downlink control channel (PDCCH) and aperiodic-channel state information-reference signal (A-CSI-RS) reception according to some aspects of the present disclosure.
Figure 4B:
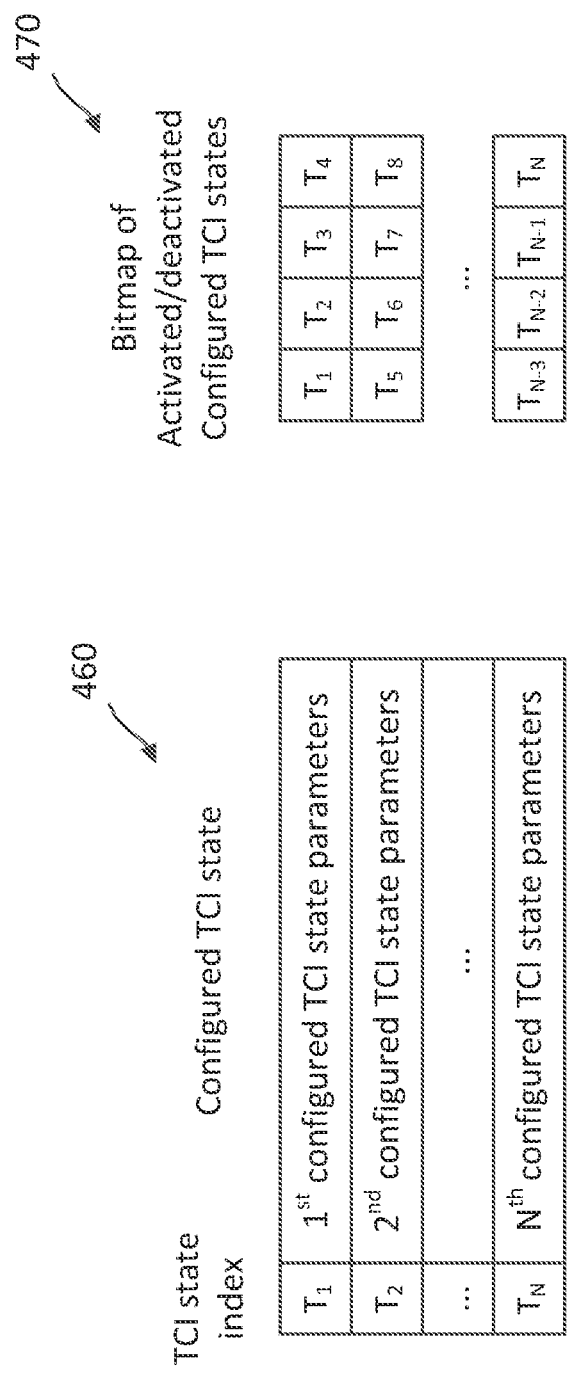
FIG. 4B illustrates configured and activated physical downlink shared channel (PDSCH) transmission configuration indication (TCI) states according to some aspects of the present disclosure.

FIGS. 4A and 4B collectively illustrate a UE's determination, from decoded PDCCH DCI, of the TCI state and associated QCL Type-D configuration to be used to receive the A-CSI-RS. The UE may correspond to a UE 115 in the network 100 receiving PDCCH DCI from a BS 105. FIG. 4A is a timing diagram 400 illustrating PDCCH and A-CSI-RS reception according to some aspects of the present disclosure. In particular, FIG. 4A illustrates the time for which the UE needs to decode the PDCCH DCI indicating the QCL Type-D configuration to receive the A-CSI-RS, as compared to when the UE will receive the A-CSI-RS itself. FIG. 4B illustrates configured and activated PDSCH TCI states according to some aspects of the present disclosure. In particular, FIG. 4B illustrates an example table of configured TCI states and a bitmap of activated TCI states are provided.

Referring to FIG. 4A, the timing diagram 400 illustrates the reception of the PDCCH DCI 410, the A-CSI-RS 420, and another DL channel or signal 430 for various symbols 206 within a slot. The A-CSI-RS 420 and the DL channel signal 430 can be arranged in frequency as shown or in any other suitable arrangement. For instance, the A-CSI-RS 420 and the DL channel signal 430 may occupy any suitable subcarriers in the symbol S2. The UE receives the PDCCH DCI at symbol S0, which indicates that the A-CSI-RS 420 is scheduled to be transmitted to the UE at symbol S2. The PDCCH DCI 410 may also indicate the TCI state and thus QCL Type-D that the UE is to use to receive the A-CSI-RS. The UE may also receive another downlink channel or reference signal 430 during the same symbol S2 during which the UE is to receive the A-CSI-RS, as indicated by the shaded signal 430 at symbol S2.

In the illustrated example of FIG. 4A, depending on the UE's capabilities and the symbols required to decode the DCI indicating the A-CSI-RS TCI state, the UE may not finish decoding the DCI until symbol S3, indicated by DCI 450, which occurs after the UE is scheduled to receive the A-CSI-RS in symbol S2 (e.g. the timing offset between the PDCCH and the A-CSI-RS is greater than a threshold). Alternatively, depending on the UE's capabilities and the number of symbols required to decode the DCI indicating the A-CSI-RS TCI state, the UE may finish decoding the DCI at symbol S1, indicated by DCI 440, which occurs before the UE is scheduled to receive the A-CSI-RS in symbol S2 (e.g. the timing offset between the PDCCH and the A-CSI-RS is less than a threshold).

FIG. 4B illustrates, on the left-hand side 460, an example table of configured TCI states. For instance, the network may configure a table of TCI states for the UE, where each index or TCI state ID (T1, T2, etc.) is associated with a particular TCI state configured for the UE, which is associated with parameters such as the QCL Type-D configuration. The right-hand side 470 of FIG. 4B illustrates a bitmap that can be used by the network to activate configured TCI states. For example, each position in the bitmap corresponds to an index of a configured TCI state (T1, T2, etc.), and the value of each bit in the bit map indicates whether the configured TCI state is to be activated or deactivated.

As discussed above, when a wireless communication device operates in a full-duplex mode, where transmit and receive occur simultaneously over the same frequency band, the transmit can introduce self interference to the receiver at the wireless communication device. Thus, while some wireless communication protocols may provide rules for determining QCL assumptions for half duplex-communication, the same QCL assumption may not applicable or provide a good performance for full-duplex operation due to the self interference.

Accordingly, the present disclosure provides techniques for a full-duplex UE to select a QCL Type-D configuration in the event that the UE is unable to finish decoding the DCI indicating the A-CSI-RS TCI state until after the UE is scheduled to receive the A-CSI-RS. The present disclosure includes selecting a QCL Type-D configuration based on the uplink beam pattern used by the UE at the same time that the UE is scheduled to receive the A-CSI-RS.

Figure 5:
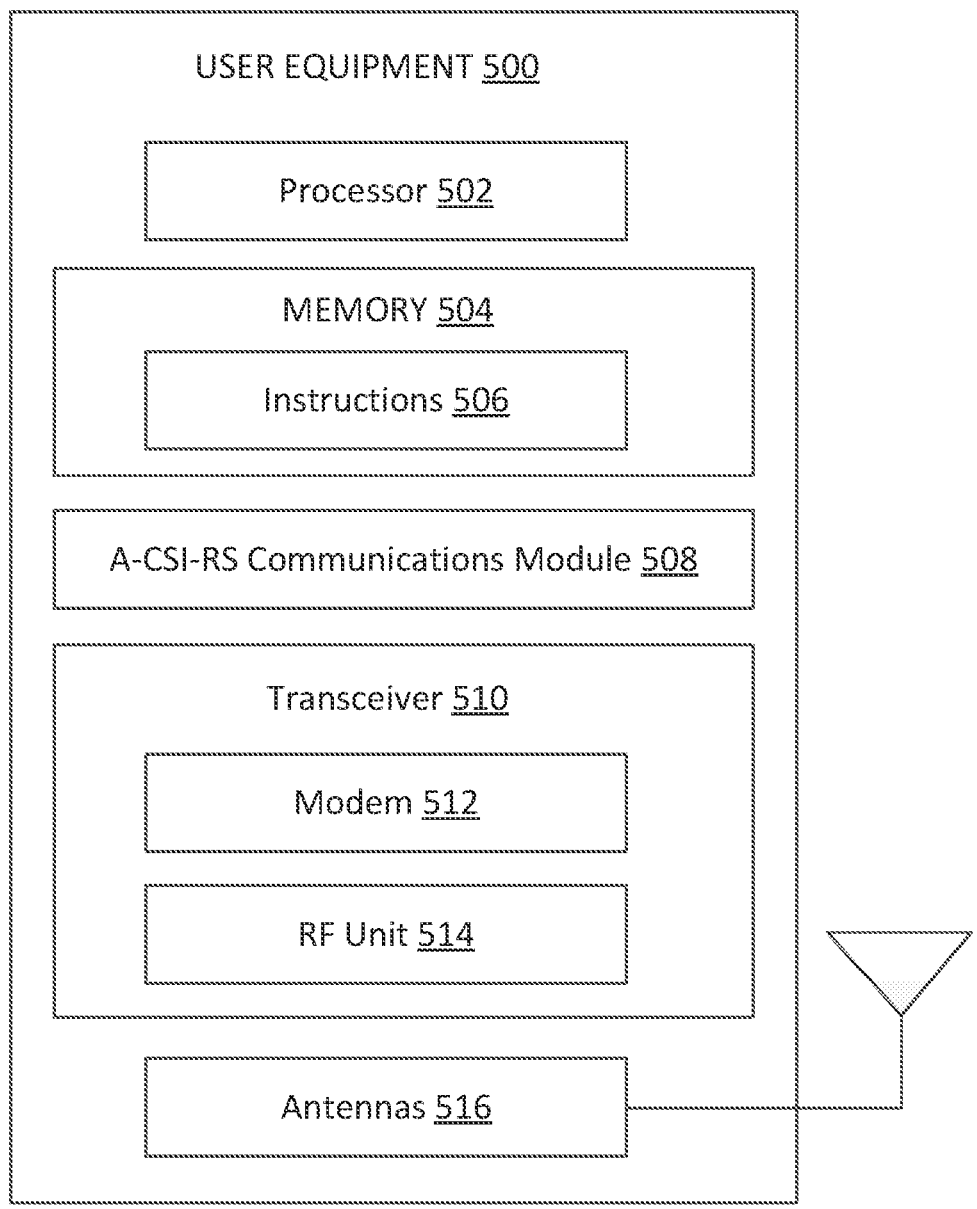
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1. As shown, the UE 500 may include a processor 502, a memory 504, a A-CSI-RS communications module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 7-9. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The A-CSI-RS communication module 508 may be implemented via hardware, software, or combinations thereof. For example, the A-CSI-RS communication module 508 may be implemented as a processor, circuit, and/or instructions 506 stored in the memory 504 and executed by the processor 502. In some examples, the A-CSI-RS communication module 508 can be integrated within the modem subsystem 512. For example, the A-CSI-RS communication module 508 can be implemented by a combination of software components (e.g., executed by a DSP or a general processor) and hardware components (e.g., logic gates and circuitry) within the modem subsystem 512. In some examples, a UE may include one or more modules comprising the A-CSI-RS communication module 508.

Figure 7:
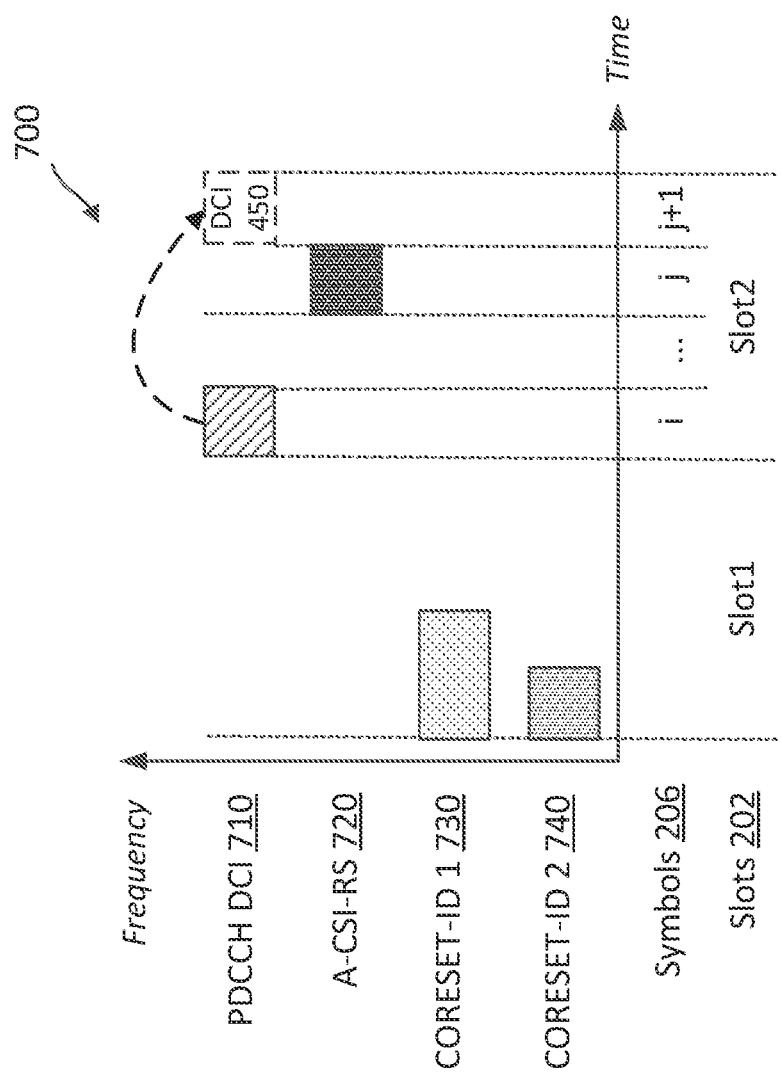
FIG. 7 illustrates a scheme for determining quasi-co-location (QCL) for A-CSI-RS according to some aspects of the present disclosure.
Figure 8:
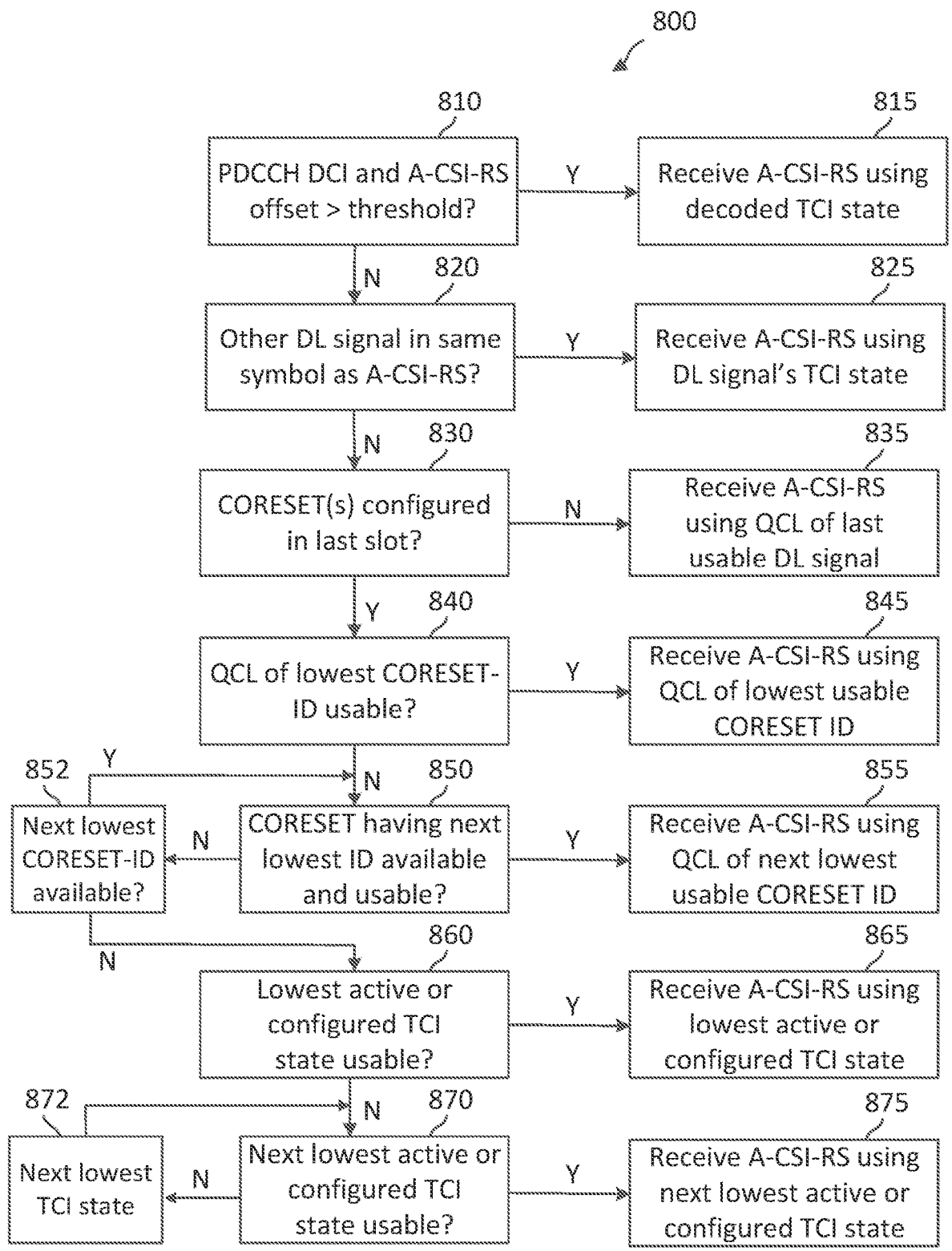
FIG. 8 is a flow diagram of a method for determining QCL for A-CSI-RS according to some aspects of the present disclosure.
Figure 9:
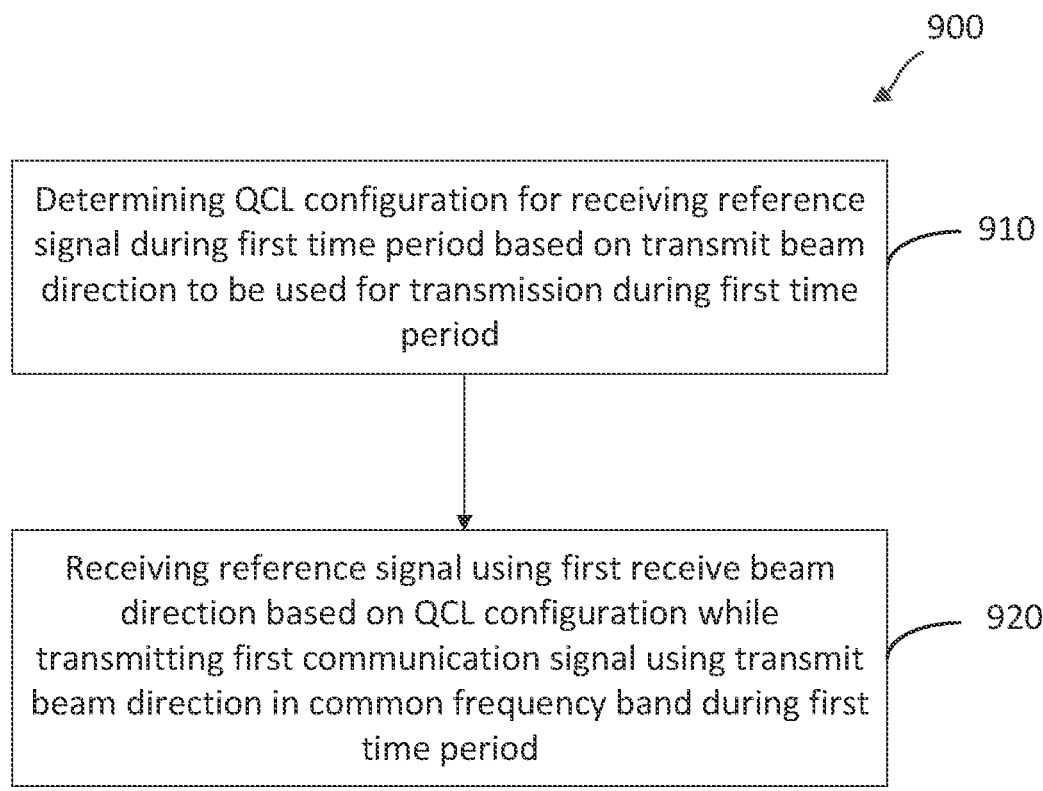
FIG. 9 is a flow diagram of a method for determining QCL for A-CSI-RS according to some aspects of the present disclosure.

The A-CSI-RS communication module 508 may be used for various aspects of the present disclosure, for example, aspects of FIGS. 7-9. The A-CSI-RS communication module 508 is configured to use a QCL Type-D configuration decoded from DCI to receive an A-CSI-RS. In some aspects, the A-CSI-RS communication module 508 is further configured to, in the event that the DCI indicating the A-CSI-RS state cannot be decoded prior to receiving the A-CSI-RS, determine a QCL Type-D to be used to receive the A-CSI-RS. In some aspects, the A-CSI-RS communication module 508 is further configured to determine a QCL Type-D based on the TCI state used to decode another downlink signal in the same symbol during which the A-CSI-RS is to be received. In some aspects, the A-CSI-RS communication module 508 is further configured to select a QCL Type-D configuration based on the TCI state of the lowest CORESET-ID received in the latest or previous slot where the CORESET' s QCL Type-D configuration is determined to be usable. In some aspects, the A-CSI-RS communication module 508 is further configured to select a QCL Type-D configuration based on the lowest configured or activated TCI state ID that is usable, in the event that none of the QCL Type-D configurations of the CORESETs are usable. In some aspects, the A-CSI-RS communication module 508 is further configured to, in the event there are no CORESETs configured for a cell, select a QCL Type-D configuration based on the TCI state of the most recent and usable downlink channel or reference signal.

In some aspects, the A-CSI-RS communication module 508 is further configured to determine, based on the uplink beam pattern to be used by the UE during the symbol in which the A-CSI-RS is scheduled to be received, whether a potential QCL Type-D configuration is usable. For example, the A-CSI-RS communication module 508 may determine whether a potential QCL Type-D configuration is usable based on the direction of the UE's uplink beam compared to the direction of the downlink beam used for receiving the A-CSI-RS as indicated by the potential QCL Type-D configuration. By way of further example, the A-CSI-RS communication module 508 may determine that a potential QCL Type-D configuration is usable based on the interference (e.g. based on a certain interference threshold) between the downlink beam used to receive the A-CSI-RS and the UE's uplink beam being transmitted at the same time or in the same symbol at which the A-CSI-RS is received. In the present disclosure, the determination of whether a QCL Type-D configuration is usable or unusable is not limited to determinations based on self-interference. In some aspects the A-CSI-RS communication module 508 is further configured to process information regarding other downlink channels or reference signals having associated TCI states and QCL Type-D configurations. In some aspects, the A-CSI-RS communication module 508 is further configured to process information regarding the UE's configured or activated TCI states.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the A-CSI-RS communication module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., configured UL transmissions, PUSCH, PUCCH, PRACH, SRS) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PDCCH, PDSCH, DCI, CORESETs, QCL Type-D configurations, TCI state tables, A-CSI-RS trigger, A-CSI-RS signal, CSI-RSs, other downlink reference signals) to the A-CSI-RS communication module 508 for processing. The antennas 516 may include multiple antennas of similar or different designs in order to sustain multiple transmission links. The RF unit 514 may configure the antennas 516.

In an example, the transceiver 510 is configured to receive, from a base station (BS), an A-CSI-RS according to a downlink beam direction indicated by a selected QCL Type-D configuration, and communicate, with the BS, the communication in the uplink beam direction, for example, by coordinating with the A-CSI-RS module to select the QCL Type-D configuration for receiving the A-CSI-RS based on the UE's uplink beam direction, or, for example, based on whether the value is usable.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
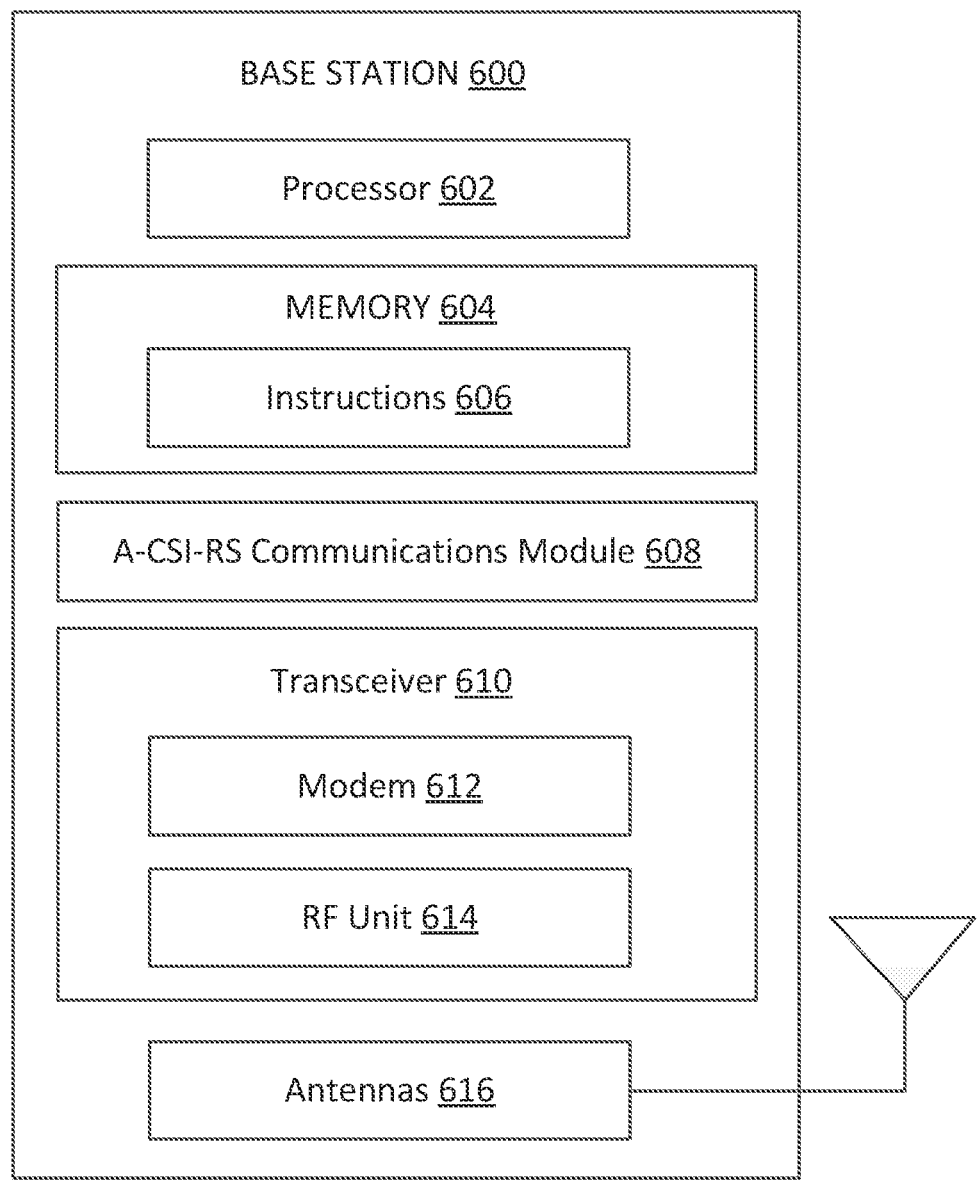
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, a A-CSI-RS communication module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 7-9. Instructions 606 may also be referred to as code, which may be interpreted broadly to include any type of computer-readable statement(s) as discussed above with respect to FIG. 5.

The A-CSI-RS communication module 608 may be implemented via hardware, software, or combinations thereof. For example, the A-CSI-RS communication module 608 may be implemented as a processor, circuit, and/or instructions 606 stored in the memory 604 and executed by the processor 602. In some examples, the A-CSI-RS communication module 608 can be integrated within the modem subsystem 612. For example, the A-CSI-RS communication module 608 can be implemented by a combination of software components (e.g., executed by a DSP or a general processor) and hardware components (e.g., logic gates and circuitry) within the modem subsystem 612. In some examples, a UE may include one or more modules comprising the A-CSI-RS communication module 608.

The A-CSI-RS communication module 608 may be used for various aspects of the present disclosure, for example, aspects of FIGS. 7-9. For example, the A-CSI-RS communication module 608 may be configured to communicate to the UE a trigger indicating the symbol in which the UE is to receive an A-CSI-RS. In some aspects, the A-CSI-RS communication module 608 is configured to transmit the A-CSI-RS to the UE. In some aspects, the A-CSI-RS communication module 608 is configured to transmit to the UE, within PDCCH DCI, information indicating the TCI state to be used to receive the A-CSI-RS. In some aspects, the A-CSI-RS communication module 608 is configured to transmit to the UE a table of configured TCI states and their associated indices. In some aspects, the A-CSI-RS communication module 608 is configured to transmit a bitmap to the UE indicating which of the configured TCI states are activated/deactivated.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PDCCH, PDSCH, DCI, CORESETs, QCL Type-D configurations (e.g. a value, index, etc.), TCI state tables, A-CSI-RS trigger, A-CSI-RS signal, CSI-RSs, other downlink reference signals) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., configured UL transmissions, PUSCH, PUCCH, PRACH, SRS) to the communication module 608 and configured transmission module 608 for processing. The antennas 616 may include multiple antennas of similar or different designs in order to sustain multiple transmission links.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

FIGS. 7-9 illustrate various mechanisms that may be employed by a UE (e.g., the UEs 115 and 500) to determine the QCL for A-CSI-RS according to some aspects of the present disclosure.

FIG. 7 illustrates a scheme 700 for determining QCL for A-CSI-RS according to some aspects of the present disclosure. In particular, FIG. 7 illustrates a resource diagram of various downlink signals received by the UE within the same frequency band, including in full duplex mode, during different slots 202. For instance, the UE receives the PDCCH DCI 710 during symbol i of Slot2 (e.g. the current slot). The UE receives A-CSI-RS during symbol j of Slot2. The UE also receives CORESETs 730 and 740, having CORESET-IDs 1 and 2 respectively, during Slot1 (e.g. the latest slot). The first symbol of the PDCCH DCI 710 can be used to trigger or grant the A-CSI-RS, indicating to the UE the upcoming symbol in which it will receive the A-CSI-RS. The PDCCH DCI 710 can also include DCI indicating the TCI state, and thus the associated QCL Type-D configuration, that the UE is to use to receive the A-CSI-RS 720. The time it takes the UE to decode the DCI indicating the TCI state for the A-CSI-RS can vary depending on the UE's capabilities and the number of symbols in which the DCI is received. For simplicity of illustration, FIG. 7 illustrates the PDCCH DCI 410, the A-CSI-RS 420, the CORESETs in separate frequency portions, though it will be recognized that the PDCCH DCI 410, the A-CSI-RS 420, the CORESETs can be configured to occupy any suitable time and/or frequency resources within a slot.

As indicated in Slot2 by DCI 750, the UE may be unable to decode the DCI indicating the QCL Type-D to be used to receive the A-CSI-RS, such that the timing offset between the PDCCH DCI and the A-CSI-RS is greater than a threshold. In that scenario, the UE may then determine whether any other downlink channels or signals are received during the same symbol during which the UE is to receive the A-CSI-RS (i.e. Slot2, symbol j). If no such channels or signals exist, the UE may then determine whether any CORESETs are configured in the previous slot. If no such CORESETs are configured, the UE can select as the QCL Type-D the TCI state associated with the most recently received downlink signal.

If a CORESET is configured in the previous slot, such as CORESETs 730 and 740 configured in Slot1, then the UE can determine whether the QCL Type-D of the CORESET having the lowest CORESET-ID—which is CORESET 730 having ID 1—is usable; if it is unusable, then the UE considers the CORESET having the next lowest ID, which is CORESET 740 having ID 2. If CORESET 740 is indeed usable, the UE will apply the QCL Type-D configuration associated with its TCI state to receive the A-CSI-RS. Or, if none of the TCI states of the CORESETs are usable, the UE can select as the QCL Type-D configuration a usable QCL associated with the configured or activated TCI state having the lowest index.

FIG. 8 is a flow diagram of a method 800 for determining QCL for A-CSI-RS according to some aspects of the present disclosure. Steps of the method 800 can be executed by a computing device (e.g., a processor, processing circuit, and/or other suitable component) of a wireless communication device or other suitable means for performing the steps. For example, a wireless communication device such as the UE 115 may utilize one or more components, such as the processor 502, the memory 404, the A-CSI-RS communications module 508, the transceiver 510, the modem 512, and the one or more antennas 516, to execute the steps of method 800. The method 800 may employ similar mechanisms as described above in FIGS. 1-7.

First, at block 810, the UE determines whether the timing offset—between receiving PDCCH DCI indicating the TCI state for the A-CSI-RS and receiving the A-CSI-RS—is greater than a threshold value. If the answer is yes (Y), then the UE proceeds to block 815 and decodes the PDCCH DCI before receiving the A-CSI-RS and uses the TCI state indicated therein for receiving the A-CSI-RS. If the answer is no (N), the UE proceeds to block 820.

At block 820, the UE determines whether there are any other downlink channels or signals with the TCI state known to the UE and are to be received in the same symbol as the A-CSI-RS. If the answer is yes (Y), then the UE proceeds to block 825 and selects the QCL configuration associated with this downlink channel/signal's TCI state as the QCL Type-D configuration for receiving the A-CSI-RS. If the answer is no (N), the UE proceeds to block 830.

At block 830, the UE determines whether there is any CORESET(s) configured in the monitored search space. In some instances, the UE may be configured with a primary cell and a secondary cell, where the secondary cell may be configured with an A-CSI-RS but may not be configured with a CORESET. If the answer is no (N), the UE proceeds to block 835 and selects the QCL configuration based on the TCI state of the most recent of any downlink channel or signal that is usable; alternatively, if the answer is no (N), the UE can proceed to block 860, which is described below. If the answer is yes (Y), the UE proceeds to block 840.

At block 840, the UE determines whether the QCL configuration associated with the CORESET having the lowest CORESET-ID is usable. If the answer is yes (Y), then the UE proceeds to block 845 and selects the QCL configuration associated with this CORESET as the QCL Type-D configuration for receiving the A-CSI-RS. If the answer is no (N), the UE proceeds to block 850.

At block 850, the UE determines whether the CORESET, if configured, having the next lowest ID is usable. If the answer is yes (Y), then the UE proceeds to block 855 and selects the QCL configuration associated with this CORESET as the QCL Type-D configuration for receiving the A-CSI-RS. If the answer is no (N), the UE considers the next CORESET, if available, having the next lowest ID in block 852. At block 852, if a CORESET having a next lowest ID is available (Y), the UE returns to block 850 to consider whether that CORESET is usable. If there are no further available CORESETs (e.g. CORESETs configured in the active BWP or monitored search space) (N), then the UE proceeds to block 860; alternatively, upon determining there are no further available CORESETs (N), the UE can proceed to block 835, which is described above.

At block 860, the UE determines whether the configured or activated TCI state having the lowest TCI state ID is usable. If the answer is yes (Y), then the UE proceeds to block 865 and selects the QCL configuration associated with this configured or activated TCI state as the QCL Type-D configuration for receiving the A-CSI-RS. If the answer is no (N) the UE proceeds to block 870.

At block 870, the UE determines whether the configured or activated TCI state having the next lowest ID is usable. If the answer is yes (Y), then the UE proceeds to block 875 and selects the QCL configuration associated with this TCI state as the QCL Type-D configuration for receiving the A-CSI-RS. If the answer is no (N), the UE considers the next active or configured TCI state having the next lowest ID in block 872 and returns to block 870.

FIG. 9 is a flow diagram of a method 900 for determining the QCL for A-CSI-RS according to some aspects of the present disclosure. Steps of the method 900 can be executed by a computing device (e.g., a processor, processing circuit, and/or other suitable component) of a wireless communication device or other suitable means for performing the steps. For example, a wireless communication device such as the UE 115 may utilize one or more components, such as the processor 502, the memory 504, the A-CSI-RS communications module 508, the transceiver 510, the modem 512, and the one or more antennas 516, to execute the steps of method 900. The method 900 may employ similar mechanisms as described above in FIGS. 1-8.

For instance, at block 910, the UE determines a QCL configuration, e.g. QCL Type-D, for receiving a reference signal during a first time period based on a transmit beam direction to be used for transmission during the first time period. At block 920, the UE receives the reference signal using a first receive beam direction based on the QCL configuration while transmitting a first communication signal using the transmit beam direction in a common frequency band during the first time period.

In some instances, the reference signal further includes an aperiodic-channel state information-reference signal (A-CSI-RS).

In some instances, the QCL configuration is associated with QCL-TypeD. In some instances, the UE may utilize one or more components, such as the processor 502, the A-CSI-RS communication module 508, the transceiver 510, the modem 512, and the one or more antennas 516, to use the QCL-TypeD to configure the downlink beam receive direction to receive the A-CSI-RS.

In some instances, the determining the QCL configuration includes determining, by the UE, whether a second communication signal associated with a transmission configuration indication (TCI) state is scheduled in the first time period as the reference signal; and selecting, by the UE, the first receive beam direction based on the TCI state in response to determining that the second communication signal associated with the TCI state is scheduled in the first time period as the reference signal. In some instances, the UE may utilize one or more components, such as the processor 502, the A-CSI-RS communication module 508, the transceiver 510, the modem 512, and the one or more antennas 516, to receive the second communication signal and the reference signal in the same time period, such as the same symbol 206.

In some instances, determining the QCL configuration further includes determining, by the UE, whether a second receive beam direction associated with a control resource set (CORESET) in a second time period before the first time period is usable for reception concurrent with the transmit beam direction. In some instances, the UE may utilize one or more components, such as the processor 502, the A-CSI-RS communication module 508, the transceiver 510, the modem 512, and the one or more antennas 516, to receive the CORESET and reference signal and determine the CORESET having the lowest CORESET-ID. The UE may further utilize such components to determine whether the downlink beam direction associated with the QCL Type-D of the CORESET having the lowest CORESET-ID is usable, for example, based on a transmit beam direction to be used by the UE for transmission during the first time period.

In some instances, the UE is further configured to determine whether the second receive beam direction associated with the CORESET is usable for reception concurrent with the transmit beam direction is in response to a determination that there is no second communication signal associated with a transmission configuration indication (TCI) state scheduled in the first time period as the reference signal. In some instances, the UE may utilize one or more components, such as the processor 502, the A-CSI-RS communication module 508, the transceiver 510, the modem 512, and the one or more antennas 516, to determine that, if there is no other downlink signal with a known TCI state scheduled in the same period (e.g. symbol) as the A-CSI-RS, then the UE considers determining the QCL configuration based on CORESET(s) configured in the previous slot.

In some instances, the UE further determines whether the second receive beam direction associated with the CORESET is usable for reception concurrent with the transmit beam direction is based on an expected interference between the second receive beam direction and the transmit beam direction. In some instances, the UE may utilize one or more components, such as the processor 502, the A-CSI-RS communication module 508, the transceiver 510, the modem 512, and the one or more antennas 516, to determine whether there is an expected interference based on, for example, the downlink beam direction or pattern for receiving the A-CSI-RS and the uplink beam direction or pattern used by the UE to transmit in the same symbol in full duplex mode.

In some instances, the UE further selects the second receive beam direction as the first receive beam direction based on determining that the second receive beam direction associated with the CORESET in the second time period is usable for reception concurrent with the transmit beam direction.

In some instances, the UE further determines whether the second receive beam direction associated with the CORESET is usable for reception concurrent with the transmit beam direction, which includes searching, by the UE, for the second receive beam direction from one or more receive beam directions associated with one or more CORESETs in the second time period, wherein the searching is from a CORESET having a lowest ID among the one more CORESETs to a CORESET having a highest ID among the one or more CORESETs.

For example, in some instances, the UE may utilize one or more components, such as the processor 502, the A-CSI-RS communication module 508, the transceiver 510, the modem 512, and the one or more antennas 516, to search for a QCL configuration from a lowest CORESET ID to a highest CORESET ID.

In some instances, the UE further searches for the second receive beam direction from one or more receive beam directions associated with the one or more CORESETs in an active bandwidth part (BWP).

In some instances, the UE further determines the QCL configuration including by determining whether a second receive beam direction associated with a transmission configuration indicator (TCI) is usable for reception concurrent with the transmit beam direction.

For example, the UE may further determine whether the second receive beam direction associated with the TCI is usable concurrent with the transmit beam direction is in response to a determination that there is no receive beam direction associated with one or more control resource sets (CORESETs) in a second time period usable for reception concurrent with the transmit beam direction, the second time period being before the first time period.

Optionally, the UE may further select the second receive beam direction as the first receive beam direction based on determining that the second receive beam direction associated with the TCI is usable for reception concurrent with the transmit beam direction.

In some instances, the UE further determines whether the second receive beam direction associated with the TCI is usable concurrent with the transmit beam direction is in response to a determination that there is no receive beam direction associated with one or more control resource sets (CORESETs) in a second time period usable for reception concurrent with the transmit beam direction, the second time period being before the first time period.

In some instances, the UE further selects the second receive beam direction as the first receive beam direction based on determining that the second receive beam direction associated with the TCI is usable for reception concurrent with the transmit beam direction. Optionally, the TCI has a lowest state ID among one or more activated TCIs. Or, the TCI has a lowest state ID among one or more configured TCIs. The activated TCI and/or the configured TCI may be similar to the configured TCI state and activated TCI state discussed above with respect to FIG. 4B.

In some instances, the UE further receives a second communication signal using the first receive beam direction during a second time period before the first time period, wherein determining the QCL configuration is further based on the first receive beam direction used for receiving the second communication signal during the second time period before the first time period.

Optionally, the determining the QCL configuration is further based on the reference signal being configured for a cell without a control resource set (CORESET).

In some instances, the UE's determination of the QCL configuration is further based on a time offset between a transmission time of a triggering downlink control information (DCI) associated with the reference signal and a transmission time of the reference signal.

Further embodiments of the present disclosure include a non-transitory computer-readable medium having program code recorded thereon. The non-transitory computer-readable medium includes code for causing a UE to determine a QCL configuration for receiving a reference signal during a first time period based on a transmit beam direction to be used for transmission during the first time period, and code for causing the UE to receive from a BS the reference signal using a first receive beam direction based on the QCL configuration while transmitting a first communication signal using the transmit beam direction in a common frequency band during the first time period.

The non-transitory computer-readable medium may also include one or more of the following features. For instance, the non-transitory computer-readable medium includes where the code for causing the UE to receive the reference signal is configured to receive, from the BS, an A-CSI-RS. The QCL configuration is associated with QCL-TypeD. The code for causing the UE to determine the QCL configuration is configured to determine whether a second communication signal associated with a TCI state is scheduled in the first time period as the reference signal, and the non-transitory computer-readable medium further includes code for causing the UE to select the first receive beam direction based on the TCI state in response to determining that the second communication signal associated with the TCI state is scheduled in the first time period as the reference signal. The code for causing the UE to determine the QCL configuration is configured to determine whether a second receive beam direction associated with a CORESET in a second time period before the first time period is usable for reception concurrent with the transmit beam direction.

The code for causing the UE to determine whether a second receive beam direction associated with the CORESET is usable for reception concurrent with the transmit beam direction is configured to determine whether the second receive beam direction is usable in response to a determination that there is no second communication signal associated with a TCI state scheduled in the first time period as the reference signal. The code for causing the UE to determine whether the second receive beam direction associated with the CORESET is usable for reception concurrent with the transmit beam direction is configured to determine whether the second receive beam direction is usable based on an expected interference between the second receive beam direction and the transmit beam direction. The code for causing the UE to select the second receive beam direction as the first receive beam direction based on determining that the second receive beam direction associated with the CORESET in the second time period is usable for reception concurrent with the transmit beam direction. The code for causing the UE to determine whether the second receive beam direction associated with the CORESET is usable for reception concurrent with the transmit beam direction is configured to search for the second receive beam direction from one or more receive beam directions associated with one or more CORESETs in the second time period, wherein the searching is from a CORESET having a lowest ID among the one more CORESETs to a CORESET having a highest ID among the one or more CORESETs. The code for causing the UE to search for the second beam direction associated with the one or more CORESETs in the second time period is configured to search for the second receive beam direction from one or more receive beam directions associated with the one or more CORESETs in an active BWP.

The code for causing the UE to determine the QCL configuration is configured to determine whether a second receive beam direction associated with a transmission configuration indicator TCI is usable for reception concurrent with the transmit beam direction. The code for causing the UE to determine whether a second receive beam direction associated with the TCI is usable for reception concurrent with the transmit beam direction is configured to determine whether the second receive beam direction is usable for reception in response to a determination that there is no receive beam direction associated with one or more CORESETs in a second time period usable for reception concurrent with the transmit beam direction, the second time period being before the first time period. The non-transitory computer-readable medium includes code for causing the UE to select the second receive beam direction as the first receive beam direction based on determining that the second receive beam direction associated with the TCI is usable for reception concurrent with the transmit beam direction. The TCI has a lowest state ID among one or more activated TCIs. The TCI has a lowest state ID among one or more configured TCIs.

The non-transitory computer-readable medium includes code for causing the UE to receive a second communication signal using the first receive beam direction during a second time period before the first time period, where the code for causing the UE to determine the QCL configuration is configured to determine the QCL configuration based on the first receive beam direction used for receiving the second communication signal during the second time period before the first time period. The code for causing the UE to determine the QCL configuration is configured to determine the QCL configuration based on the reference signal being configured for a cell without a CORESET. The code for causing the UE to determine the QCL configuration is configured to determine the QCL configuration based on a time offset between a transmission time of a triggering DCI associated with the reference signal and a transmission time of the reference signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a user equipment (UE), whether any receive beam direction associated with one or more control resource sets (CORESETs) in a second time period is usable for receiving a reference signal during a first time period using an uplink transmit beam direction for uplink transmissions during the first time period, wherein the second time period is before the first time period;
   determining, by the UE in response to a determination that no receive beam direction associated with the one or more CORESETs in the second period is usable, a quasi-co-location (QCL) configuration for receiving the reference signal during the first time period based on the uplink transmit beam direction to be used for the uplink transmission during the first time period; and
   receiving, by the UE from a base station (BS), the reference signal using a first receive beam direction based on the determined QCL configuration while transmitting a first communication signal using the uplink transmit beam direction in a common frequency band during the first time period.

2. The method of claim 1, wherein the QCL configuration is associated with QCL-TypeD and the receiving the reference signal includes:
   receiving, by the UE from the BS, an aperiodic-channel state information-reference signal (A-CSI-RS).

3. The method of claim 1, wherein:
   the determining the QCL configuration includes:
      determining, by the UE, whether a second communication signal associated with a transmission configuration indicator (TCI) state is scheduled in the first time period; and
   the method further comprises:
      selecting, by the UE, the first receive beam direction based on the TCI state in response to determining that the second communication signal associated with the TCI state is scheduled in the first time period as the reference signal.

4. The method of claim 1, wherein the determining whether any receive beam direction associated with the one or more CORESETs is usable for receiving the reference signal includes:
   determining, by the UE, whether a second receive beam direction associated with a CORESET of the one or more CORESETs in the second time period is usable for reception concurrent with the uplink transmit beam direction.

5. The method of claim 4, wherein the determining whether the second receive beam direction associated with the CORESET is usable for reception concurrent with the uplink transmit beam direction is in response to a determination that there is no second communication signal associated with a transmission configuration indicator (TCI) state scheduled in the first time period.

6. The method of claim 4, wherein the determining whether the second receive beam direction associated with the CORESET is usable for reception concurrent with the uplink transmit beam direction is based on an expected interference between the second receive beam direction and the uplink transmit beam direction.

7. The method of claim 4, further comprising:
   selecting, by the UE, the second receive beam direction as the first receive beam direction based on determining that the second receive beam direction associated with the CORESET in the second time period is usable for reception concurrent with the uplink transmit beam direction.

8. The method of claim 7, wherein the determining whether the second receive beam direction associated with the CORESET is usable for reception concurrent with the uplink transmit beam direction includes:
   searching, by the UE, for the second receive beam direction from one or more receive beam directions associated with the one or more CORESETs in the second time period, wherein the searching is from a CORESET having a lowest ID among the one more CORESETs to a CORESET having a highest ID among the one or more CORESETs and the one or more receive beam directions are associated with the one or more CORESETs in an active bandwidth part (BWP).

9. The method of claim 1, wherein the determining the QCL configuration includes:
   determining, by the UE, whether a second receive beam direction associated with a transmission configuration indicator (TCI) is usable for reception concurrent with the uplink transmit beam direction.

10. The method of claim 9, further comprising:
   selecting, by the UE, the second receive beam direction as the first receive beam direction based on determining that the second receive beam direction associated with the TCI is usable for reception concurrent with the uplink transmit beam direction, wherein the TCI has a lowest state ID among at least one of one or more activated TCIs or one or more configured TCIs.

11. The method of claim 1, further comprising:
receiving, by the UE, a second communication signal using the first receive beam direction during the second time period before the first time period,
wherein the determining the QCL configuration is further based on the first receive beam direction used for receiving the second communication signal during the second time period before the first time period and on the reference signal being configured for a cell without a control resource set (CORESET).

12. The method of claim 1, wherein the determining the QCL configuration is further based on a time offset between a transmission time of a triggering downlink control information (DCI) associated with the reference signal and a transmission time of the reference signal.

13. A user equipment (UE) comprising:
a processor configured to:
determine whether any receive beam direction associated with one or more control resource sets (CORESETs) in a second time period is usable for receiving a reference signal during a first time period, using an uplink transmit beam direction for uplink transmissions during the first time period,
wherein the second time period is before the first time period; and
determine, in response to a determination that no receive beam direction associated with the one or more CORESETs is usable, a quasi-co-location (QCL) configuration for receiving the reference signal during the first time period based on the uplink transmit beam direction to be used for the uplink transmission during the first time period; and
a transceiver configured to receive from a base station (BS) the reference signal using a first receive beam direction based on the determined QCL configuration while transmitting a first communication signal using the uplink transmit beam direction in a common frequency band during the first time period.

14. The UE of claim 13, wherein the QCL configuration is associated with QCL-TypeD and the transceiver configured to receive the reference signal is configured to:
receive from the BS an aperiodic-channel state information-reference signal (A-CSI-RS).

15. The UE of claim 13, wherein:
the processor configured to determine the QCL configuration is configured to:
determine whether a second communication signal associated with a transmission configuration indicator (TCI) state is scheduled in the first time period as the reference signal; and
the processor is further configured to:
select the first receive beam direction based on the TCI state in response to determining that the second communication signal associated with the TCI state is scheduled in the first time period.

16. The UE of claim 13, wherein the processor configured to determine the QCL configuration is configured to:
determine whether a second receive beam direction associated with a CORESET of the one or more CORESETs in the second time period is usable for reception concurrent with the uplink transmit beam direction.

17. The UE of claim 16, wherein the processor is further configured to:
select the second receive beam direction as the first receive beam direction based on determining that the second receive beam direction associated with the CORESET in the second time period is usable for reception concurrent with the uplink transmit beam direction.

18. The UE of claim 17, wherein the processor configured to determine whether the second receive beam direction associated with the CORESET is usable for reception concurrent with the uplink transmit beam direction is configured to:
search for the second receive beam direction from one or more receive beam directions associated with the one or more CORESETs in the second time period, wherein the searching is from a CORESET having a lowest ID among the one more CORESETs to a CORESET having a highest ID among the one or more CORESETs and the one or more receive beam directions are associated with the one or more CORESETs in an active bandwidth part (BWP).

19. The UE of claim 13, wherein the processor configured to determine the QCL configuration is configured to:
determine whether a second receive beam direction associated with a transmission configuration indicator (TCI) is usable for reception concurrent with the uplink transmit beam direction.

20. The UE of claim 19, wherein the processor is further configured to:
select the second receive beam direction as the first receive beam direction based on determining that the second receive beam direction associated with the TCI is usable for reception concurrent with the uplink transmit beam direction, wherein the TCI has a lowest state ID among at least one of one or more activated TCIs or one or more configured TCIs.

21. The UE of claim 13, wherein the processor configured to determine the QCL configuration is configured to:
determine the QCL configuration based on a time offset between a transmission time of a triggering downlink control information (DCI) associated with the reference signal and a transmission time of the reference signal.

22. A user equipment (UE) comprising:
means for determining, by a user equipment (UE), whether any receive beam direction associated with one or more control resource sets (CORESETs) in a second time period is usable for receiving a reference signal during a first time period, using an uplink transmit beam direction for uplink transmissions during the first time period, wherein the second time period is before the first time period;
means for determining, in response to a determination that no receive beam direction associated with the one or more CORESETs is usable, a quasi-co-location (QCL) configuration for receiving the reference signal during the first time period based on the uplink transmit beam direction to be used for the uplink transmission during the first time period; and
means for receiving from a base station (BS) the reference signal using a first receive beam direction based on the determined QCL configuration while transmitting a first communication signal using the uplink transmit beam direction in a common frequency band during the first time period.

23. The UE of claim 22, wherein the QCL configuration is associated with QCL-TypeD and the means for receiving the reference signal is configured to:
receive from the BS, an aperiodic-channel state information-reference signal (A-CSI-RS).

24. The UE of claim 22, wherein the means for determining whether any receive beam direction associated with the one or more CORESETs is usable is configured to:
determine whether a second receive beam direction associated with a CORESET of the one or more CORESETs in the second time period is usable for reception concurrent with the uplink transmit beam direction.

25. The UE of claim 24, further comprising:
means for selecting the second receive beam direction as the first receive beam direction based on determining that the second receive beam direction associated with the CORESET in the second time period is usable for reception concurrent with the uplink transmit beam direction.

26. The UE of claim 25, wherein the means for selecting the second receive beam direction includes:
means for searching for the second receive beam direction from one or more receive beam directions associated with the one or more CORESETs in the second time period from a CORESET having a lowest ID among the one more CORESETs to a CORESET having a highest ID among the one or more CORESETs, wherein the one or more receive beam directions are associated with the one or more CORESETs in an active bandwidth part (BWP).

27. The UE of claim 22, wherein the means for determining the QCL configuration is configured to:
determine whether a second receive beam direction associated with a transmission configuration indicator (TCI) is usable for reception concurrent with the uplink transmit beam direction.

28. The UE of claim 27, wherein the means for determining the QCL configuration is configured to determine whether the second receive beam direction associated with the TCI is usable concurrent with the uplink transmit beam direction in response to a determination that there is no receive beam direction associated with the one or more control resource sets (CORESETs) in the second time period usable for reception concurrent with the uplink transmit beam direction.

* * * * *